(No Model.)
R. PORTER.
MILK STRAINER.
No. 417,584. Patented Dec. 17, 1889.
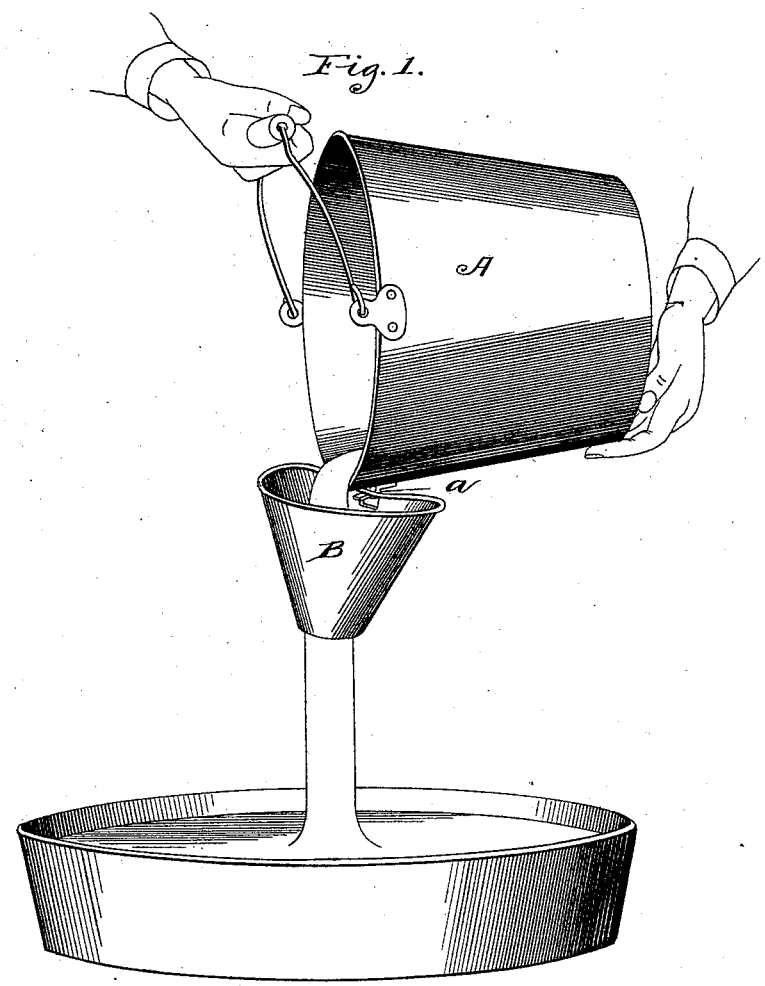
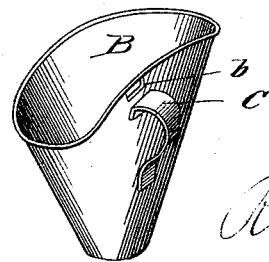

UNITED STATES PATENT OFFICE.

RUFUS PORTER, OF LEWISTOWN, ILLINOIS.

MILK-STRAINER.

SPECIFICATION forming part of Letters Patent No. 417,584, dated December 17, 1889.

Application filed March 11, 1889. Serial No. 302,888. (No model.)

*To all whom it may concern:*

Be it known that I, RUFUS PORTER, a citizen of the United States, residing at Lewistown, in the county of Fulton and State of Illinois, have invented certain new and useful Improvements in Milk-Strainers, of which the following is a specification.

My invention relates to means for facilitating the straining of milk or other liquids conveniently and in a cleanly and expeditious manner.

The primary object of my invention is to provide a strainer which may be readily attached to a pail, the contents of which it is desired to strain, the pail being adapted to receive and support the strainer and permit its ready attachment and removal; and my invention obviates the objections attendant upon the use of the ordinary strainer-pail, or the common cone-shaped strainer having a flanged base.

The common strainer-pail used in milking is objectionable, because the strainer, being permanently fixed to the pail, becomes fouled with hair, dust, and other objectionable material rubbed off the cow, and the milk when poured through the strainer carries this foreign matter with it. As ordinarily made it is difficult or almost impossible to pour a pailful of milk into one of these cone-shaped strainers without overflowing it. The usual method when the pail is full is to dip out part of the milk and pour it into the strainer before attempting to pour directly from the pail, the strainer either being held in the hand or allowed to rest on the upper edge or bottom of the milk-receiving vessel. In the majority of cases, when it is not held in the hand, it rests on the bottom of the pan or crock, the latter being too large to admit of the strainer resting upon its upper edge. In this case the strainer must be held above the surface of the milk before it will flow entirely therefrom. The mouth of the ordinary milk-can is, of course, always small enough to support the strainer, but the can is seldom used in straining milk.

In the drawings, Figure 1 is a perspective view showing the strainer in use. Fig. 2 is a similar view of the strainer detached.

In the drawings, A represents a pail which is prepared to receive the strainer by being provided with a catch $a$, which in this instance is a flat strip of metal having one of its ends riveted to the pail and the other end bent outwardly to form a hook.

B represents my strainer, which I prefer to make funnel-shaped, and provide in its lower end a strainer-cloth of wire-gauze or other suitable material.

This strainer is adapted to be secured to the catch on the pail by means of a slot $b$ in the wall of the strainer near its top. This connection permits the free movement of the strainer with relation to the pail, so that when the latter is tipped to allow the milk to flow the plane of the mouth of the pail is at right angles to the plane of the opening of the strainer, the latter hanging vertically.

I prefer to make the top of the strainer of irregular outline, the wall of the strainer being bent or curved inwardly on the side which in use will be next the pail, as clearly shown in the drawings. This segmental curving of the wall of the strainer provides an elongated opening therefor and prevents the backflow of the milk, the inwardly-bent wall rising abruptly, as it does, tending to prevent the flow of the milk over that side of the strainer. This construction also permits the strainer to conform more closely to the curvature of the pail, whereby the spilling of the milk in straining is avoided, and the suspension-point of the strainer is brought nearer its center of weight, so that it hangs vertically.

I prefer to provide the strainer with a handle C for the convenient manipulation of the strainer, which handle is attached to the side of the strainer, which is bent inwardly, thus adapting the handle to serve as a stop to limit the movement of the strainer and insure its retention in proper position with relation to the pail during the operation of straining. For this purpose the top of the handle C will project to a level with the top of the strainer.

The form of the strainer may be varied, as well as the details of the construction of the same, so long as the essential features thereof—namely, its adaptation for ready attachment to and removal from the pail—are preserved.

It is intended that the strainer shall at all times, except during the process of straining, be detached from the pail, leaving the latter free to be used for any purpose for which the ordinary pail may be used, and that the same strainer may be used on several pails where a number of persons are engaged in the work of milking at the same place; hence the easy attaching and detaching of the strainer are of the first importance.

I claim—

1. A funnel-shaped strainer having an elongated opening and a handle adapted to serve as a stop to hold the strainer in proper position with relation to the pail, in combination with a suitable hook or catch for connecting the strainer pivotally to the pail, substantially as described.

2. A funnel-shaped strainer and a suitable device whereby to pivotally attach it to a pail, and having an elongated opening, a slot near the margin of said opening, and a handle below said opening, adapted to serve as a stop, whereby to hold said strainer in proper relation to the pail to receive the liquid contents of the latter, substantially as described.

RUFUS PORTER.

Witnesses:
W. W. FOX,
H. A. GORE.